United States Patent
Iwabuchi et al.

(10) Patent No.: US 6,815,692 B2
(45) Date of Patent: Nov. 9, 2004

(54) RADIATION IMAGE STORAGE PANEL

(75) Inventors: Yasuo Iwabuchi, Kanagawa (JP); Keiko Neriishi, Kanagawa (JP)

(73) Assignee: Fuji Photo Film Co., Ltd., Kanagawa (JP)

(*) Notice: Subject to any disclaimer, the term of this patent is extended or adjusted under 35 U.S.C. 154(b) by 150 days.

(21) Appl. No.: 10/347,394

(22) Filed: Jan. 21, 2003

(65) Prior Publication Data
US 2003/0218139 A1 Nov. 27, 2003

(30) Foreign Application Priority Data
Jan. 18, 2002 (JP) .................................. 2002-010668

(51) Int. Cl.$^7$ .................................................. G21K 4/00
(52) U.S. Cl. .................................. 250/484.4; 250/581
(58) Field of Search .......................... 250/484.4, 581, 250/582, 583, 584, 585, 488.1, 487.1, 483.1

(56) References Cited

U.S. PATENT DOCUMENTS

| | | | | |
|---|---|---|---|---|
| 5,786,600 A | * | 7/1998 | Lambert et al. | 250/484.4 |
| 6,031,236 A | * | 2/2000 | Arakawa et al. | 250/484.4 |
| 6,168,730 B1 | * | 1/2001 | Nabeta et al. | 252/301.4 H |
| 6,740,897 B2 | * | 5/2004 | Hosoi | 250/584 |
| 2003/0075689 A1 | * | 4/2003 | Iwabuchi et al. | 250/484.4 |

* cited by examiner

*Primary Examiner*—Constantine Hannaher
*Assistant Examiner*—Otilia Gabor
(74) *Attorney, Agent, or Firm*—Sughrue Mion, PLLC

(57) ABSTRACT

A radiation image storage panel having a deposited phosphor layer, wherein the phosphor layer comprises an alkali metal halide stimulable phosphor containing a small amount of oxygen atom and is annealed after deposition has high-sensitivity and gives a reproduced radiation image of high quality.

7 Claims, 1 Drawing Sheet

RADIATION IMAGE STORAGE PANEL

FIELD OF THE INVENTION

The invention relates to a radiation image storage panel favorably employable in a radiation image recording and reproducing method utilizing stimulated emission of a stimulable phosphor.

BACKGROUND OF THE INVENTION

When the stimulable phosphor is exposed to radiation such as X-rays, it absorbs and stores a portion of the radiation energy. The stimulable phosphor then emits stimulated emission according to the level of the stored energy when the phosphor is exposed to electromagnetic wave such as visible light or infrared rays (i.e., stimulating light).

A radiation image recording and reproducing method utilizing the stimulable phosphor is widely employed in practice. The method employs a radiation image storage panel comprising the stimulable phosphor, and comprises the steps of causing the stimulable phosphor of the storage panel to absorb radiation energy having passed through an object or having radiated from an object; sequentially exciting the stimulable phosphor with a stimulating light to emit stimulated light; and photo-electrically detecting the emitted light to obtain electric signals giving a visible radiation image. The storage panel thus processed is then subjected to a step for erasing radiation energy remaining therein, and then stored for the use in the next recording and reproducing procedure. Thus, the radiation image storage panel can be repeatedly used.

The radiation image storage panel (often referred to as "stimulable phosphor sheet") has a basic structure comprising a support and a stimulable phosphor layer provided thereon. If the phosphor layer is self-supporting, the support may be omitted. On the free surface (surface not facing the support) of the phosphor layer, a protective film is generally placed to keep the phosphor layer from chemical deterioration or physical damage.

The stimulable phosphor layer generally comprises a binder and stimulable phosphor particles dispersed therein, but it may consist of agglomerated phosphor without binder. The phosphor layer containing no binder can be formed by vapor deposition process or firing process.

It is desired that the radiation image storage panel has a sensitivity as high as possible and further give a reproduced radiation image of high quality (particularly, in regard of sharpness and graininess).

As described above, the radiation image storage panel having a stimulable phosphor film (layer) can be prepared by a vapor deposition process (or vapor-accumulating process) such as a vacuum vapor deposition (evaporation) process or a sputtering process. In the evaporation process, for example, an electron beam or a resistance heater is applied onto a stimulable phosphor or its starting materials (i.e., evaporation source) to heat and vaporize the source, to deposit the vapor on a support sheet (i.e., substrate) to form a phosphor film on the substrate.

Thus formed phosphor film consists essentially of prismatic crystals of the stimulable phosphor without binder. In the phosphor film (layer), there are cracks among the prismatic crystals of the stimulable phosphor. For this reason, the stimulating rays are efficiently applied to the phosphor and the stimulated emission are also efficiently taken out. Hence, a reproduced radiation image of high sharpness can be obtained with high sensitivity.

As a stimulable phosphor suitable for the vapor deposition process, an alkali halide stimulable phosphor has been known. For example, JP-2,060,688 and WO 01/03156 disclose some alkali halide stimulable phosphors. However, there is given no description of oxygen in the phosphor layer of alkali halide stimulable phosphor.

SUMMARY OF THE INVENTION

An object of the present invention is to provide a radiation image storage panel giving a reproduced radiation image of high quality with high sensitivity.

According to the study of the present inventors on the preparation of a phosphor layer by vapor deposition, it has been noted that the sensitivity can be remarkably improved by incorporating a specific amount of oxygen evenly in the phosphor layer. This means that, in order to increase the amount of stimulated emission from the phosphor layer, it is important to make a certain amount of oxygen is present in prismatic phosphor crystals and further to submit the deposited phosphor layer to heat treatment by which oxygen atoms are separated from the activator (such as Eu) and diffused evenly in the phosphor layer. The oxygen atoms in the phosphor crystals compensate electric charges of the activators such as Eu, and hence the separation of oxygen from the activator improves efficiencies of activation and charge transfer of the activator. As a result, the amount of stimulated emission emitted from the phosphor layer is remarkably increased.

The present invention resides in a radiation image storage panel having a deposited phosphor layer, wherein the phosphor layer comprises an alkali metal halide stimulable phosphor having the formula (I):

$$M^{I}X \cdot aM^{II}X'_2 \cdot bM^{III}X''_3 : yA, zO \qquad (I)$$

in which $M^{I}$ is at least one alkali metal element selected from the group consisting of Li, Na, K, Rb and Cs; $M^{II}$ is at least one alkaline earth metal element or divalent metal element selected from the group consisting of Be, Mg, Ca, Sr, Ba, Ni, Cu, Zn and Cd; $M^{III}$ is at least one rare earth element or trivalent metal element selected from the group consisting of Sc, Y, La, Ce, Pr, Nd, Pm, Sm, Eu, Gd, Tb, Dy, Ho, Er, Tm, Yb, Lu, Al, Ga and In; each of X, X' and X" independently is at least one halogen selected from the group consisting of F, Cl, Br and I; A is at least one rare earth element or metal element selected from the group consisting of Y, Ce, Pr, Nd, Sm, Eu, Gd, Tb, DY, Ho, Er, Tm, Yb, Lu, Na, Mg, Cu, Ag, Tl and Bi; and a, b, y and z are numbers satisfying the conditions of $0 \leq a < 0.5$, $0 \leq b < 0.5$, $0 < y < 1.0$ and $0 < z \leq 0.2$, respectively, and oxygen contents represented by $z_1$ and $z_2$ at optionally determined two areas in the phosphor layer satisfy the condition of $0.2 \leq z_1/z_2 \leq 5$.

The invention further resides in a process for preparing a radiation image storage panel having a deposited alkali metal halide stimulable phosphor layer on a support sheet which comprises the steps of:

depositing on the support sheet vapors of components of the alkali metal halide stimulable phosphor in an atmosphere having an oxygen partial pressure in the range of $1 \times 10^{-6}$ to $1 \times 10^{-2}$ Pa to form on the support sheet a deposited phosphor layer comprising an alkali metal halide stimulable phosphor having the aforementioned formula (I), and annealing the deposited phosphor layer by heating the phosphor layer.

DETAILED DESCRIPTION OF THE INVENTION

Figure 1:
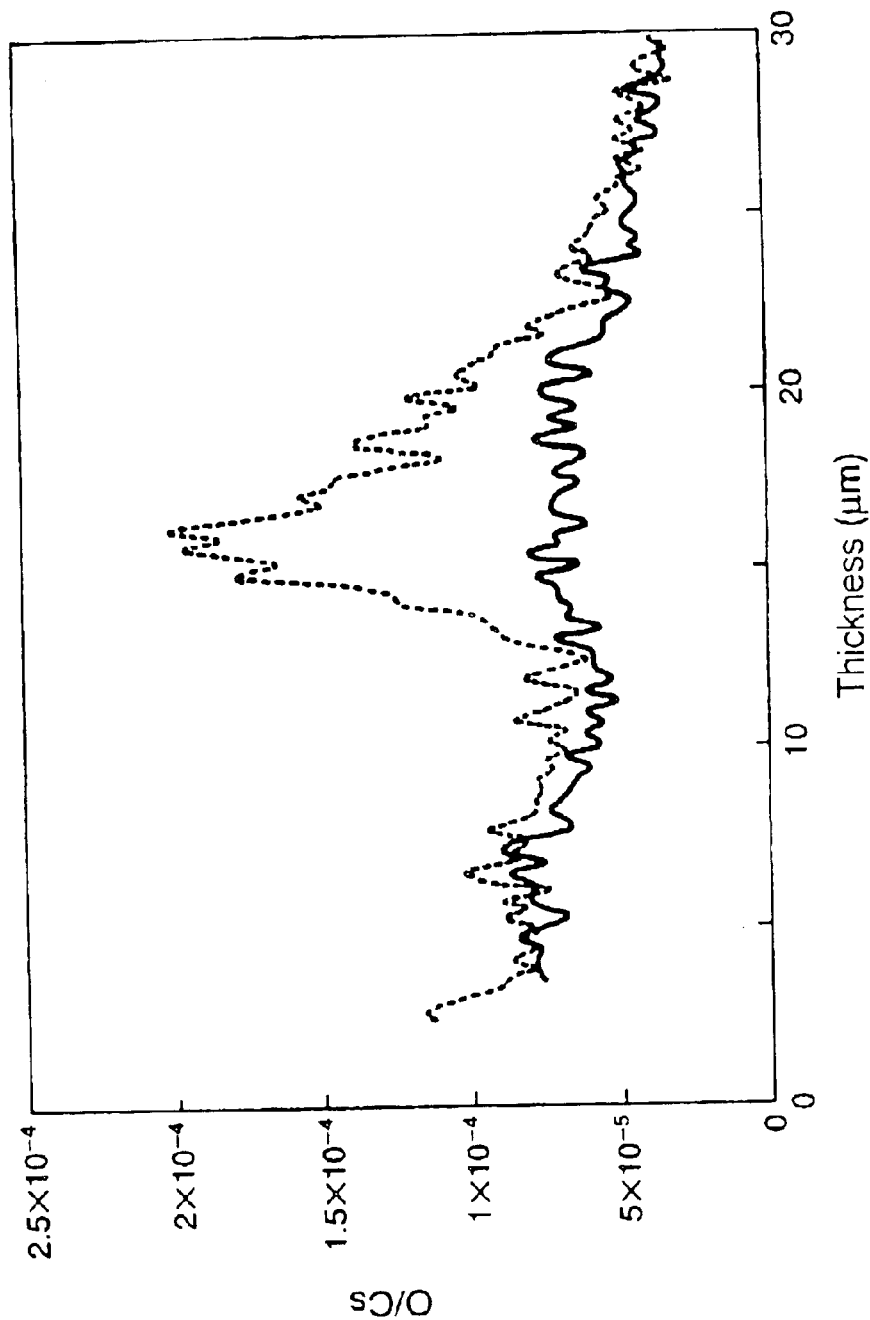
FIG. 1 is a graph showing a relationship between the thickness (depth) of phosphor layer and the oxygen content (O/Cs ratio).

In the radiation image storage panel of the invention, z in the formula (I) preferably is a number satisfying the condition of $1 \times 10^{-5} \leq z \leq 0.05$. Further, $M^I X$ and A in the formula (I) are preferably CsBr and Eu, respectively.

In the phosphor layer, oxygen contents $z_1$ and $z_2$ at optionally determined areas preferably satisfy the condition of $0.2 \leq z_1/z_2 \leq 5$.

The phosphor layer of the radiation image storage panel of the invention is preferably prepared by a vapor evaporation process. Further, it is particularly preferred that the phosphor layer be formed by the steps of: vaporizing an evaporation source comprising the stimulable phosphor or its starting materials, to deposit the vapor on a substrate at a partial pressure of oxygen of $1.0 \times 10^{-6}$ to $1.0 \times 10^{-2}$ Pa; and then subjecting the deposited layer to heat treatment.

The radiation image storage panel of the invention is described below, referring to the case that the phosphor layer is formed by an electron beam evaporation process, which is a kind of vapor deposition processes.

From one aspect, the electron beam evaporation process is superior to an evaporation process using a resistance heater, because an electron beam can heat an evaporation source so locally and so immediately that the vaporization rate can be easily controlled and that the composition of the phosphor or its materials in the source is less different from that of the phosphor in the resultant layer.

The stimulable phosphor used in the storage panel of the invention is represented by the formula (I). In the phosphor, a metal oxide (such as aluminum oxide, silicon dioxide or zirconium oxide) may be added as an additive in an amount of not more than 0.5 mol based on 1 mol of $M^I X$.

Generally, the substrate on which the vapor is deposited also serves as a support sheet of the radiation image storage panel. Accordingly, it can be optionally selected from supports used in the conventional storage panels. Sheets of quartz glass, sapphire, metals (e.g., aluminum, iron, tin, chromium) or heat-resistant resins (e.g., aramide) are preferred. On the substrate, a light reflecting layer such as a layer containing a titanium dioxide or a light absorbing layer such as a layer containing carbon black can be placed. Further, for improving the sharpness of the resultant image, fine concaves or convexes may be formed on the phosphor layer-side surface of the substrate (or on the phosphor layer-side surface of the auxiliary layer such as an undercoating layer (adhesive layer), the light-reflecting layer or the light-absorbing layer, if it is provided).

If the phosphor layer is formed by a multi-evaporation process, at least two evaporation sources are used. One of the two sources comprises a component for the matrix of phosphor ($M^I X$), and the other comprises a component for the activator (A). In the case that the vapor pressure of the matrix component is extremely different from that of the activator component, the multi-evaporation process is preferably adopted because the vaporizing rate of each component can be individually controlled. In the process, oxygen (which is indispensable in the present invention) is supplied in the form of gas into the deposition atmosphere. The evaporation source may consist of the matrix component or the activator component alone, or may contain additives. Further, three or more sources may be used. For example, evaporation sources of additives may be used in addition to the sources of the matrix component and the activator component.

The matrix component may be a compound itself ($M^I X$), or a mixture of plural components that are reacted with each other to give the matrix compound. The activator component is generally a compound containing the activating element, for example, a halide of the element.

If the activator A is Eu, an europium (Eu) compound is used as the activator component. An europium compound generally contains both $Eu^{2+}$ and $Eu^{3+}$, but the stimulable emission (or even the instant emission) is emitted from a phosphor containing $Eu^{2+}$ activator. The activator component, therefore, preferably contains an $Eu^{2+}$ compound in an amount of 70% or more by molar ratio. The europium compound is preferably $EuBr_x$, and x is preferably a number satisfying the condition of $2.0 \leq x \leq 2.3$.

In order to avoid bumping of the evaporation source, it is preferred that the water content of the evaporation source is as less as possible such as 0.5 wt. % or less. The source may be heated in advance at a temperature of 100 to 300° C. under reduced pressure, or may be heated to a temperature above the melting point of the phosphor for tens of minutes to a few hours under dry atmosphere such as nitrogen gas atmosphere, to remove water.

The evaporation source has a relative density preferably in the range of 80% to 98%, more preferably in the range of 90% to 96%. If the relative density is so small that the source is in the form of powder, troubles may occur. For example, the powder of the source is liable to fly and scatter in the deposition process or to be unevenly vaporized so that the resultant deposited layer has uneven thickness. Accordingly, the evaporation source preferably has such a high density that stable deposition can be ensured. In order to make the evaporation source have a density in the above range, the source in the form of powder is generally pressed at a pressure of not less than 20 MPa or heated to melt to form a tablet. However, it is not always necessary for the evaporation source to be in the form of a tablet.

The evaporation source, particularly the source comprising the component for phosphor matrix, preferably contains no alkali metal impurities (alkali metals not constituting the phosphor). Preferably, content of alkaline earth metal impurities (alkaline earth metals not constituting the phosphor) is in an amount of 10 ppm or less, more preferably 1 ppm or less. The evaporation source can be prepared from materials containing almost no alkali metal and alkaline earth metal impurities. The deposited layer prepared from that source is less contaminated with the impurities, and hence gives an increased amount of stimulated emission.

In the process for the invention, the evaporation source or evaporation sources and the substrate are first set in a vacuum evaporation apparatus. The apparatus is then evacuated to give an inner pressure of $1 \times 10^{-5}$ to $1 \times 10^{-2}$ Pa. An inert gas such as Ar gas or Ne gas may be supplied into the apparatus so that the partial pressure of oxygen would be adjusted to a level in the range of $1 \times 10^{-6}$ to $1 \times 10^{-2}$ Pa. The partial pressure of oxygen in the apparatus is preferably set at $7 \times 10^{-3}$ Pa or less by means of, for example, a combination of diffusion pump and cold trap.

In the vacuum evaporation apparatus, electron beams generated by two electron guns are then individually applied to the evaporation sources. The accelerating voltage of each electron beam preferably is in the range of 1.5 kV to 5.0 kV. By applying the electron beams, the evaporation sources of matrix component and activator component are heated, vaporized, reacted with each other to form the deposited phosphor layer on the substrate. The evaporation (or deposition) rate can be controlled by adjusting the accelerating voltage of each electron beam, and is generally in the range of 0.1 to 1,000 µm/min., preferably in the range of 1 to 100 µm/min. The electron beams may be applied several times to form two or more layers. The substrate may be cooled or heated, if needed, during the deposition procedure.

After the deposition procedure was complete, the resulting layer is subjected to heat treatment (annealing treatment), which is, for example, carried out at a temperature of 50 to 600° C. for at least one hour, preferably several hours under nitrogen gas atmosphere (which may contain oxygen gas or hydrogen gas a little).

If the phosphor layer is to be formed by a single (pseudo-single) evaporation process, one evaporation source separately comprising the matrix component and the activator component is preferably used. In the deposition procedure, the area of the matrix component and the area of the activator component are individually heated by means of a single electron beam. The time for applying the beam onto each area is controlled to form a layer consisting of uniform stimulable phosphor.

The phosphor layer may be formed by applying an electron beam onto an evaporation source of the phosphor compound.

Otherwise, for forming the phosphor layer by deposition, a layer consisting of the phosphor matrix may be previously formed. In this procedure, a prismatic phosphor layer is favorably formed. The additives such as the activator are then diffused in the layer of phosphor matrix by heating during the deposition procedure and/or the heat treatment. In thus formed phosphor crystals, the border between the matrix and the additives is not always clear.

Thus, a phosphor layer in which prismatic crystals of the alkali metal halide stimulable phosphor represented by the formula (I) are grown almost along the thickness direction is formed. The oxygen component is incorporated from the atmosphere into the crystals in the deposition process, and forms A(activator)-O(oxygen) complex to compensate the charge of A (activator). The oxygen component is then separated by the heat treatment from the activator to diffuse into the crystals, and thereby the efficiency of charge transfer in the crystals and the activation efficiency of the activator are improved to increase the amount of stimulated emission of the phosphor.

The oxygen content z in the formula (I) is generally in the range of $0 < z \leq 0.2$, preferably in the range of $1 \times 10^{-5} \leq z \leq 0.05$. The oxygen content z is an average value in the whole area of the phosphor layer of the radiation image storage panel.

The oxygen is preferably contained evenly in the phosphor layer along the surface of the layer, and hence the oxygen contents (O/M') $z_1$ and $z_2$ at optionally determined two areas in the phosphor layer preferably satisfy the condition of $0.2 \leq z_1/z_2 \leq 5$. For determining the oxygen content of each area, an area of 1 cm² or near is preferably measured. Even when the above condition may be not satisfied in a small part (for example, less than 10%, particularly less than 5%) of the phosphor layer, the effect of the invention can be realized. The above condition means, in other words, that the oxygen atoms are contained in essentially whole area of phosphor layer, and the oxygen content in whole area represented by z satisfies the condition of:

(average of z)×1√5 ≤ z ≤ (average of z)×√5.

The phosphor layer contains no binder, and consists essentially of the alkali metal halide stimulable phosphor. In the phosphor layer, there may be formed spaces (cracks) among the prismatic crystals. The thickness of the layer depends upon various conditions such as characters of the aimed panel and conditions of the deposition process, but is generally in the range of 50 µm to 1 mm, preferably in the range of 200 to 700 µm.

In the invention, the vapor deposition process may be carried out by means of a resistance heater as well as an electron beam. Further, other known vapor deposition processes such as a sputtering process and a chemical vapor deposition (CVD) process may be adopted. These vapor deposition processes or evaporation processes are described in detail in various known publications.

It is not necessary for the substrate to serve as a support sheet of the radiation image storage panel. For example, after a phosphor layer is formed on the substrate, the phosphor layer is peeled from the substrate and fixed with an adhesive on an independently prepared support. Further, the storage panel may have no support sheet (substrate).

It is preferred to place a transparent protective film on the surface of the phosphor layer, so as to ensure good handling of the radiation image storage panel in transportation and to avoid deterioration. The protective film preferably is transparent enough to give almost no effect to passage of stimulating rays and simulated emission. Further, for protecting the storage panel from chemical deterioration and physical damage, the protective film preferably is chemically stable, physically strong, and of high moisture proof.

The protective film can be provided by coating the stimulable phosphor film with a solution in which an organic polymer (e.g., cellulose derivatives, polymethyl methacrylate, fluororesins soluble in organic solvents) is dissolved in a solvent, by placing a beforehand prepared sheet for the protective film (e.g., a film of organic polymer such as polyethylene terephthalate, a transparent glass plate) on the phosphor film with an adhesive, or by depositing vapor of inorganic compounds on the phosphor film.

Further, various additives may be dispersed in the protective film. Examples of the additives include light-scattering fine particles (e.g., particles of magnesium oxide, zinc oxide, titanium dioxide and alumina), a slipping agent (e.g., powders of perfluoroolefin resin and silicone resin) and a crosslinking agent (e.g., polyisocyanate). The thickness of the protective film generally is in the range of about 0.1 to 20 µm (if the film is made of polymer material) or in the range of about 100 to 1,000 µm (if the film is made of inorganic material such as silicate glass).

For enhancing the resistance to stain, a fluororesin layer is preferably provided on the protective film. The fluororesin layer can be formed by coating the surface of the protective film with a solution in which a fluororesin is dissolved or dispersed in an organic solvent, and drying the coated solution. The fluororesin may be used singly, but a mixture of the fluororesin and a film-forming resin can be employed. In the mixture, an oligomer having polysiloxane structure or perfluoroalkyl group can be further added. In the fluororesin layer, fine particle filler may be incorporated to reduce blotches caused by interference and to improve the quality of the resultant image. The thickness of the fluororesin layer is generally in the range of 0.5 to 20 µm. For forming the fluororesin layer, additives such as a crosslinking agent, a film-hardening agent and an anti-yellowing agent can be used. In particular, the cross-linking agent is advantageously employed to improve durability of the fluororesin layer.

Thus, a representative radiation image storage panel of the invention can be prepared. The storage panel of the invention may be in known various structures. For example, in order to improve sharpness of the reproduced radiation image, at least one of the films may be colored with a colorant which does not absorb the stimulated emission but the stimulating rays.

EXAMPLE 1

(1) Preparation of CsBr Evaporation Source

The powdery CsBr (75 g) was placed in a powder molding zirconia die (inner diameter: 35 mm) and compressed in a powder molding press (Tablepress TB-5 type, NPA System Co., Ltd.) at a pressure of 50 MPa, to produce a tablet (diameter: 35 mm, thickness: 20 mm). The pressure applied to the powdery CsBr was approx. 40 MPa. The tablet was dried in a vacuum drying apparatus at 200° C., for 2 hours. The dried tablet had a density of 3.9 g/cm$^3$, and a water content of 0.3 wt. %.

(2) Preparation of EuBr$_x$ Evaporation Source

The powdery EuBr$_x$ (x=2.2, 25 g) was placed in a powder molding zirconia die (inner diameter: 25 mm) and compressed in a powder molding press (Tablepress TB-5 type, NPA System Co., Ltd.) at a pressure of 50 MPa, to produce a tablet (diameter: 25 mm, thickness: 10 mm). The pressure applied to the powdery CsBr was approx. 80 MPa. The tablet was dried in a vacuum drying apparatus at 200° C., for 2 hours. The dried tablet had a density of 5.1 g/cm$^3$, and a water content of 0.5 wt. %.

(4) Formation of Phosphor Film

A synthetic quartz substrate was washed successively with an aqueous alkaline solution, purified water, and isopropyl alcohol, and then mounted to a substrate holder within an evaporation apparatus. In the apparatus, the CsBr tablet and EuBr$_x$ tablet were placed in the predetermined sites. Subsequently, the apparatus was evacuated using a combination of a rotary pump, mechanical booster, and turbo molecular pump to reach 1×10$^{-3}$ Pa.

In the apparatus, the substrate was heated to 200° C. by means of a sheath heater placed on the back side of the substrate. An electron beam from an electron gun (accelerating voltage: 4.0 kV) was applied onto each tablet so as to deposit a CsBr:Eu,O layer on the substrate at a rate of 10 μm/min. The emission current of each electron gun was controlled so that the Eu/Cs molar content ratio might be 0.0001/1. The surrounding gas within the evaporation apparatus was analyzed by means of mass spectrometer, and it was found that the partial pressure of water in the apparatus was 4.0×10$^{-3}$ Pa.

After the evaporation-deposition was complete, the inner pressure was returned to atmospheric pressure, and the substrate was taken out of the apparatus. The substrate having the deposited phosphor layer was placed in a vacuum heating apparatus in which gases could be introduced. After the apparatus was evacuated to approx. 1 Pa by means of a rotary pump to remove water adsorbed on the deposited layer, the substrate was heated at 200° C. for 2 hours under nitrogen gas atmosphere. Subsequently, the substrate was cooled in vacuo and thus cooled substrate was then taken out of the apparatus. On the substrate, a deposited film (layer) (thickness: approx. 400 μm, area: 10 cm×10 cm) consisting of prismatic phosphor crystals aligned densely and perpendicularly was formed.

Thus, a radiation image storage panel of the invention having a substrate and a deposited phosphor layer was prepared.

EXAMPLE 2

The procedures of Example 1 were repeated except that the emission current of each electron gun was controlled so that the Eu/Cs molar content ratio would be 0.001/1, to prepare a radiation image storage panel of the invention.

EXAMPLE 3

The procedures of Example 1 were repeated except that the emission current of each electron gun was controlled so that the Eu/Cs molar content ratio would be 0.01/1, to prepare a radiation image storage panel of the invention.

Comparison Example 1

The procedures of Example 1 were repeated except that the emission current of each electron gun was controlled so that the Eu/Cs molar content ratio would be 0.001/1 and that the heat treatment was not performed, to prepare a radiation image storage panel of the invention.

Comparison Example 2

The procedures of Example 1 were repeated except that the emission current of each electron gun was controlled so that the Eu/Cs molar content ratio would be 0.001/1 and that oxygen gas was introduced into the apparatus to adjust the inner pressure at 5×10$^{-2}$ Pa after the heat treatment, to prepare a radiation image storage panel of the invention.

Evaluation of Radiation Image Storage Panel

The prepared radiation image storage panels were examined in the following manner.

Each storage panel was installed in a light-shielding cassette, and was exposed to a X-ray (80 kVp). After the cassette was taken out, the storage panel was exposed to stimulating rays from a laser (wavelength: 633 nm), and stimulated emission was detected with a photomultiplier to measure the amount of stimulated emission. On the basis of the obtained amount of stimulated emission (relative value), the sensitivity of the storage panel was estimated.

The oxygen content (z, O/Cs ratio) in the phosphor layer of the panel was determined in the following manner. In a secondary ion mass spectrometer (SIMS), a primary ion beam was applied onto the phosphor layer and thereby the phosphor layer was made to sputter secondary ions to measure. When Cs ions were to be measured, O ions were used as the ion specie of the primary ion beam. When O ions were to be measured, Cs ions were used as the specie for the primary beam. The measurement was repeatedly performed at several areas on the surface of the phosphor layer, and the ratio of O/Cs at each point was obtained. Further, while the phosphor layer was being etched along the thickness for a long time, the SIMS measurement was also repeatedly performed at several areas to obtain the O/Cs ratio at each point.

Thus obtained ratios were averaged to determined the O/Cs ratio of the phosphor layer. If the O/Cs ratio at every point satisfied the condition of (average) x 1√5≦z≦ (average) x√5, the phosphor layer was considered to contain oxygen evenly.

The results are set forth in Table 1 and FIG. 1.

TABLE 1

|  | O/Cs ratio | oxygen distribution | sensitivity |
| --- | --- | --- | --- |
| Ex. 1 | 0.0003 | even | 80 |
| Ex. 2 | 0.002 | even | 100 |
| Ex. 3 | 0.009 | even | 90 |

TABLE 1-continued

|        | O/Cs ratio | oxygen distribution | sensitivity |
|--------|-----------|---------------------|-------------|
| C. Ex. 1 | 0.002 | uneven | 5 |
| C. Ex. 2 | 0.3   | even   | 2 |

FIG. 1 is a graph showing a relation between the thickness (depth) of phosphor layer and the oxygen content (O/Cs ratio). In FIG. 1, the solid line and the broken line represent the relations in the layers of Example 2 (after the heat treatment) and Comparison Example 1 (before the heat treatment), respectively.

The results shown in Table 1 and FIG. 1 indicate that the radiation image storage panels of the invention (Examples 1 to 3), whose phosphor layers contained oxygen evenly in a content of 0.2 or less, gave remarkably high sensitivities. In contrast, the radiation image storage panel not subjected to the heat treatment (Comparison Example 1) had a phosphor layer containing oxygen unevenly (as shown in FIG. 1), and as a result gave a very low sensitivity. Further, the storage panel whose phosphor layer contained oxygen in a content of more than 0.2 (Comparison Example 1) also gave a very low sensitivity.

As is clear from the above results, it remarkably increases the amount of stimulated emission from an alkali halide stimulable phosphor layer to incorporate a certain amount of oxygen evenly into the layer. Accordingly, the radiation image storage panel of the invention has a high sensitivity. Further, if the radiation image storage panel of the invention has a deposited phosphor layer of prismatic crystals, the image panel gives a reproduced radiation image of high quality. The radiation image storage panel of the invention, therefore, is preferably employable in the radiation image recording and reproducing method for medical diagnosis.

What is claimed is:

1. A radiation image storage panel having a deposited phosphor layer, wherein the phosphor layer comprises an alkali metal halide stimulable phosphor having the formula (I):

$$M^{I}X \cdot aM^{II}X'_2 \cdot bM^{III}X''_3 : yA, zO \qquad (I)$$

in which $M^{I}$ is at least one alkali metal element selected from the group consisting of Li, Na, K, Rb and Cs; $M^{II}$ is at least one alkaline earth metal element or divalent metal element selected from the group consisting of Be, Mg, Ca, Sr, Ba, Ni, Cu, Zn and Cd; $M^{III}$ is at least one rare earth element or trivalent metal element selected from the group consisting of Sc, Y, La, Ce, Pr, Nd, Pm, Sm, Eu, Gd, Tb, Dy, Ho, Er, Tm, Yb, Lu, Al, Ga and In; each of X, X' and X" independently is at least one halogen selected from the group consisting of F, Cl, Br and I; A is at least one rare earth element or metal element selected from the group consisting of Y, Ce, Pr, Nd, Sm, Eu, Gd, Tb, Dy, Ho, Er, Tm, Yb, Lu, Na, Mg, Cu, Ag, Tl and Bi; and a, b, y and z are numbers satisfying the conditions of $0 \leq a < 0.5$, $0 \leq b < 0.5$, $0 < y < 1.0$ and $0 < z \leq 0.2$, respectively, and oxygen contents represented by $z_1$ and $z_2$ at optionally determined two areas in the phosphor layer satisfy the condition of $0.2 \leq z_1/z_2 \leq 5$.

2. The radiation image storage panel of claim 1, wherein z in the formula (I) is a number satisfying the condition of $1 \times 10^{-5} \leq z \leq 0.05$.

3. The radiation image storage panel of claim 1, wherein an alkali metal halide stimulable phosphor is a cerium bromide stimulable phosphor having the formula (II):

$$CsBr::yEu, zO \qquad (II)$$

wherein each of y and z has the same meaning as defined in claim 1.

4. A process for preparing a radiation image storage panel having a deposited alkali metal halide stimulable phosphor layer on a support sheet which comprises the steps of:

depositing on the support sheet vapors of components of the alkali metal halide stimulable phosphor in an atmosphere having an oxygen partial pressure in the range of $1 \times 10^{-6}$ to $1 \times 10^{-2}$ Pa to form on the support sheet a deposited phosphor layer comprising an alkali metal halide stimulable phosphor having the formula (I):

$$M^{I}X \cdot aM^{II}X'_2 \cdot bM^{III}X''_3 : yA, zO \qquad (I)$$

in which $M^{I}$ is at least one alkali metal element selected from the group consisting of Li, Na, K, Rb and Cs; $M^{II}$ is at least one alkaline earth metal element or divalent metal element selected from the group consisting of Be, Mg, Ca, Sr, Ba, Ni, Cu, Zn and Cd; $M^{III}$ is at least one rare earth element or trivalent metal element selected from the group consisting of Sc, Y, La, Ce, Pr, Nd, Pm, Sm, Eu, Gd, Tb, Dy, Ho, Er, Tm, Yb, Lu, Al, Ga and In; each of X, X' and X" independently is at least one halogen selected from the group consisting of F, Cl, Br and I; A is at least one rare earth element or metal element selected from the group consisting of Y, Ce, Pr, Nd, Sm, Eu, Gd, Tb, Dy, Ho, Er, Tm, Yb, Lu, Na, Mg, Cu, Ag, Tl and Bi; and a, b, y and z are numbers satisfying the conditions of $0 \leq a < 0.5$, $0 \leq b < 0.5$, $0 < y < 1.0$ and $0 < z \leq 0.2$, respectively, and annealing the deposited phosphor layer by heating the phosphor layer.

5. The process of claim 4, wherein the depositing step is performed at a pressure of $1 \times 10^{-5}$ to $1 \times 10^{-2}$ Pa.

6. The process of claim 4, wherein the depositing step is performed by applying an electron beam to a source of the components of the alkali metal halide stimulable phosphor.

7. The process of claim 4, the annealing is performed at a temperature of 50 to 600° C. for at least one hour.

* * * * *